3,598,846
METHOD FOR HYDROLYZING
TETRACHLOROALKANES
Ryoichi Wakasa, Kazuo Saotome, and Toshiaki Yamasaki, Tokyo, Japan, assignors to Asahi Kasei Kogyo Kabushiki Kaisha, Osaka, Japan
No Drawing. Continuation of application Ser. No. 658,045, Aug. 3, 1967, which is a continuation-in-part of application Ser. No. 359,776, Apr. 14, 1964. This application Aug. 12, 1969, Ser. No. 850,340
Int. Cl. C11c 3/00
U.S. Cl. 260—408    6 Claims

ABSTRACT OF THE DISCLOSURE

A method for producing in high yield ω-chlorocarboxylic acids of the formula $Cl(CH_2)_nCOOH$, wherein $n$ is an even integer between 10 and 14 inclusive. Said method comprises simultaneously contacting a tetrachloroalkane of the formula $Cl(CH_2)_nCCl_3$, wherein $n$ is as defined above with nitric acid or fuming nitric acid, particularly fuming nitric acid of specific gravity greater than 1.50, in the presence of oxygen at a temperature of 40°–80° C. to form a mixture and passing gaseous nitrogen dioxide in an amount of at least ⅓ of the weight of the nitric acid used through said mixture to convert the tetrachloroalkane to the corresponding ω-chlorocarboxylic acid.

---

This application is a continuation of application Ser. No. 658,045 filed on Aug. 3, 1967 (now abandoned) which in turn is a continuation-in-part of application Ser. No. 359,776 filed on April 14, 1964, now abandoned.

This invention relates to a method for manufacturing ω-chlorocarboxylic acids by hydrolyzing the corresponding tetrachloroalkanes having the formula $Cl(CH_2)_nCCl_3$.

Such compounds can be used as disclosed in Chem. Techn., 9 (1957), pps. 139–150 and also in U.S. Pat. No. 3,244,733 to produce ω-aminocarboxylic acids by a reaction with ammonia according to the equation:

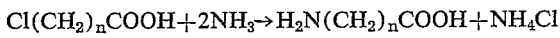

$Cl(CH_2)_nCOOH + 2NH_3 \rightarrow H_2N(CH_2)_nCOOH + NH_4Cl$

The resulting ω-amino acids are in turn used in forming a polyamide. U.S. Pat. No. 2,462,855 discloses other uses of ω-amino acids.

As for a method of manufacturing ω-chlorocarboxylic acids by hydrolyzing the trichloromethyl radical of a tetrachloroalkane to a carboxyl radical, there is known a method which comprises heating a tetrachloroalkane in the presence of a mineral acid such as sulfuric acid, nitric acid or the like.

The hydrolysis reaction is expressed by the following chemical reaction formula:

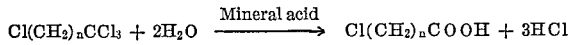

$Cl(CH_2)_nCCl_3 + 2H_2O \xrightarrow{\text{Mineral acid}} Cl(CH_2)_nCOOH + 3HCl$ When hydrolyzing with nitric acid, concentrated nitric acid or fuming nitric acid, the acid is generally used in amounts equimolar or greater than equimolar with respect to the tetrachloroalkane. When a mixture of tetrachloroalkane and nitric acid is heated while being stirred, the reaction proceeds with the generation of HCl gas. The temperature necessary to initiate the reaction rises as the molecular weight of the tetrachloroalkane increases, and is generally within the range of 40° C. to 90° C. It is known that the yield of ω-chlorocarboxylic acid is greater when the hydrolyzing agent is nitric acid than when it is sulfuric acid, when the molecular weight of the tetrachloroalkane is relatively large. It is also known that when a relatively higher molecular weight tetrachloroalkane, e.g. one having more than 9 carbon atoms is subjected to hydrolysis, the reaction rate is low. For example, in the case of tetrachloroundecane, the yield is less than 70 percent. When tetrachloroalkanes of higher molecular weight than tetrachloroundecane are hydrolyzed, the yields fall below 50 percent. Even when the reactions are carried out under forced conditions such as a high temperature, it is impossible to increase the reaction yields. Moreover, in such cases, side reactions which bring about unfavorable products such as nitro compounds or the like are induced simultaneously.

Accordingly, it is an object of the present invention to provide a method of producing in high yield ω-chlorocarboxylic acids having a relatively high molecular weight by hydrolysis of the corresponding tetrachloroalkanes.

According to the present invention, the hydrolysis of tetrachloroalkanes in the presence of nitric acid is carried out while introducing gaseous nitrogen dioxide in an amount of at least ⅓ of the amount of the nitric acid used to the reaction mixture which step has the effect of remarkably increasing the yield. The starting tetrachloroalkanes are compounds readily synthesized by the telomerization of ethylene and carbon tetrachloride. They are important compounds as intermediates in the production of valuable high molecular weight compounds.

In studies relating to the hydrolysis of tetrachloroalkanes in the presence of nitric acid, or fuming nitric acid, the following facts have been found by us. The course of the hydrolysis is dominated to a remarkable extent by the concentration or specific gravity of the concentrated or fuming nitric acid used in the reaction. When the molecular weight of the tetrachloroalkane is relatively high, fuming nitric acid having a greater specific gravity gives a favorable result. That is, when the number of carbon atoms in the tetrachloroalkanes is increased, fuming nitric acid of lower specific gravity is not effective to cause the reaction. For example, with fuming nitric acid of specific gravity of 1.50, tetrachloroundecane can hardly be hydrolyzed to the corresponding ω-chlorocarboxylic acid even when the reaction temperature is elevated to about 80° C.

In the hydrolysis by use of nitric acid, the generated hydrochloric acid is found to be oxidized to yield water according to the following reaction formula:

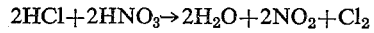

$2HCl + 2HNO_3 \rightarrow 2H_2O + 2NO_2 + Cl_2$

This can be verified by the fact that the gas generated by the reaction consists mainly of nitric oxide ($NO_2$ or $N_2O_4$) and of chlorine and not HCl.

When hydrochloric acid is oxidized, an equivalent number of moles of water is formed. As a result of this, the nitric acid is diluted with water as the reaction proceeds, even though a part of the formed water is consumed by the hydrolysis reaction.

The present inventors ascribed the reason for the hydrolysis reaction being interrupted without completion to the dilution effect by water due to the oxidation of hydrochloric acid generated during the reaction, and advanced their efforts for the improvement of the reaction yield.

In the hydrolysis reaction by use of nitric acid, the reaction temperature is in the range of 40° C. to 80° C. When a mixture of fuming nitric acid and a tetrachloroalkane is heated to the above-mentioned temperature range while being agitated, the reaction proceeds while generating nitrogen dioxide, chlorine and hydrochloric acid. In this temperature range, decomposition of nitric acid hardly occurs, but in the presence of oxygen, there exists an equilibrium between water, nitric acid, and nitrogen dioxide as expressed by the following simplified formula:

$$2H_2O + 4NO_2 + O_2 \rightleftharpoons 4HNO_3$$

When nitrogen dioxide is blown into the reaction system in the presence of oxygen, the position of the equilibrium shifts toward the right, which shift prevents the dilution effect of the water formed by the oxidation of hydrochloric acid. As a result of this, the course of the reaction is not interrupted by water formation and ω-chlorocarboxylic acids are produced in high yield. For said purpose, gaseous nitrogen dioxide should be passed in an amount of at least ⅓ of the weight of the nitric acid used in the reaction system, preferably ⅓–1 and more preferably about ½ thereof through the reaction mixture during the reaction.

It is difficult to analyze the reasons for the effectiveness of the present invention completely, but the foregoing may explain the reason fairly satisfactorily.

The oxides of nitrogen are complicated, and there are many kinds of them. However, in the presence of oxygen, the nitrogen dioxide state is most stable. In the presence of water and oxygen, all of them are in equilibrium with nitric acid. In the above chemical equation, nitrogen dioxide is a representative of all of them. The nitrogen oxides useful in the present invention are not limited to nitrogen dioxide. Other nitrogeneous compounds such as nitrogen monoxide or the like are also usable. However, since in the reaction system they actually exist in the form of nitrogen dioxide, they are represented by the formula for nitrogen dioxide.

In the practice of the present invention, more than the stoichiometric amount of nitric acid or fuming nitric acid is added to the tetrachloroalkanes. When the mixture is heated to more than 40° C. while being stirred, the reaction proceeds with generation of gas. While keeping the reaction system in contact with oxygen, and passing nitrogen dioxide gas through the reaction system, the reaction is carried out at a temperature of from 40° C. to 80° C. generally for from 2 to 4 hours. On completion of the reaction, the reaction mixture is cooled and diluted with water, by which ω-chlorocarboxylic acids are precipitated. They are further purified by distillation or recrystallization.

In order that those skilled in the art may more fully understand the nature and advantage of the present invention, the following examples are given by way of illustration.

EXAMPLE 1

300 parts by weight of fuming nitric acid having a specific gravity of 1.52 were added to 118 parts by weight of tetrachloroundecane. While stirring the mixture, the temperature was gradually raised from 40° C. to 70° C. Within this temperature range, the reaction proceeds with generation of gas. While blowing 80 parts by weight of nitrogen dioxide gas for 3 hours, the reaction was completed in 3 hours. After the completion of the reaction, volatile matter such as nitric acid or the like was driven off under reduced pressure. While cooling the reaction mixture, 300 parts by weight of water were added, whereupon crystals of ω-chloroundecanoic acid were separated. The resulting crystals were dissolved in ether and recrystallized from petroleum-ether. 75 parts of ω-chloroundecanoic acid were obtained which correspond to 83 percent conversion in one cycle.

Inasmuch as 14 parts by weight of unreacted tetrachloroundecane were recovered from the mother liquor, the yield of ω-chloroundecanoic acid vs. tetrachloroundecane was 94 percent of theoretical.

EXAMPLE 2

320 parts by weight of fuming nitric acid having a specific gravity of 1.52 were added to 130 parts by weight of tetrachlorotridecane. While stirring the mixture, the temperature was raised gradually from 40° C. to 70° C. Within this temperature range, the reaction was initiated. The reaction was carried out in the manner of Example 1, but 95 parts by weight of nitrogen dioxide were passed through the system during 4 hours of reaction time. The resulting product was treated as in Example 1 and 78 parts by weight of ω-chlorotridecanoic acid were obtained, and 18 parts by weight of unreacted tetrachlorotridecane were recovered. This result corresponds to 78 percent conversion in one cycle and 90 percent yield of ω-chlorotridecanoic acid vs. tetrachlorotridecane.

EXAMPLE 3

350 parts by weight of fuming nitric acid having a specific gravity of 1.52 were added to 175 parts by weight of tetrachloropentadecane. The resulting mixture was heated while being stirred. When the temperature reached about 50° C., the reaction was initiated with generation of gas. As soon as the reaction was initiated, nitrogen dioxide gas was blown into the reaction system, and the temperature of the reaction system was raised gradually to 80° C. in 4 hours so as not to stop the gas generation. 200 parts of nitrogen dioxide were charged during the reaction time of 4 hours. The reaction product was treated as in Example 1, and 87 parts by weight of ω-chloropentadecanoic acid and 42 parts of unreacted tetrachloropentadecane were obtained. The yield, allowing for unreacted starting material, was 91 percent.

We claim:

1. A method for producing ω-chlorocarboxylic acids of the formula $Cl(CH_2)_nCOOH$, wherein $n$ is an even integer between 10 and 14 inclusive, said method comprising simultaneously contacting a tetrachloroalkane of the formula $Cl(CH_2)_nCCl_3$, wherein $n$ is as defined above, with fuming nitric acid having a specific gravity of 1.52 in the presence of oxygen at a temperature of 40° to 80° C. to form a mixture and passing gaseous nitrogen dioxide through said mixture to convert the tetrachloroalkane to the corresponding ω-chlorocarboxylic acid, the amount of nitrogen dioxide passed through the mixture being 0.27 to 0.57 part per part of fuming nitric acid.

2. The method according to claim 1 in which the fuming nitric acid and the tetrachloroalkane are present in a weight ratio of greater than 1:1.

3. The method according to claim 1 in which the ratio is 2–2.5:1.

4. The method according to claim 1 in which $n$ is 10.

5. The method according to claim 1 in which $n$ is 12.

6. The method according to claim 1 in which $n$ is 14.

References Cited

FOREIGN PATENTS 1,396,049   4/1965   France _____ 260—408

OTHER REFERENCES

Asahi, Chem. Abstracts, 33:5531 (1965).
Friedlina et al., Chem. Abstracts 50:1578–9 (1956).

ALEX MAZEL, Primary Examiner

R. J. GALLAGHER, Assistant Examiner

UNITED STATES PATENT OFFICE
CERTIFICATE OF CORRECTION

Patent No. 3,598,846      Dated August 10, 1971

Inventor(s) Ryoichi Wakasa, et al

It is certified that error appears in the above-identified patent and that said Letters Patent are hereby corrected as shown below:

In the heading to the printed specification, after line 10, should read -- Claims priority, application Japan, Apr. 30, 1963, 22,178 --.

Signed and sealed this 10th day of October 1972.

(SEAL)
Attest:

EDWARD M. FLETCHER, JR.
Attesting Officer

ROBERT GOTTSCHALK
Commissioner of Patents